United States Patent
Donadille et al.

(10) Patent No.: US 8,141,259 B2
(45) Date of Patent: Mar. 27, 2012

(54) METHOD OF DETERMINING THE DIP OF A FORMATION

(75) Inventors: Jean-Marc Donadille, Al-Khobar (SA); Khaled Hadj-Sassi, Al-Khobar (SA)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/797,155

(22) Filed: Jun. 9, 2010

(65) Prior Publication Data
US 2011/0303005 A1 Dec. 15, 2011

(51) Int. Cl.
*E21B 47/00* (2006.01)
(52) U.S. Cl. .................................. 33/1 E; 33/302
(58) Field of Classification Search ............ 33/1 E, 33/302, 303, 304, 308
See application file for complete search history.

(56) References Cited

U.S. PATENT DOCUMENTS

| | | | |
|---|---|---|---|
| 5,351,122 A * | 9/1994 | Niebauer et al. | 356/496 |
| 5,892,151 A * | 4/1999 | Niebauer et al. | 73/382 R |
| 5,903,349 A | 5/1999 | Vohra et al. | |
| 6,502,037 B1 | 12/2002 | Jorgensen et al. | |
| 6,671,057 B2 | 12/2003 | Orban | |
| 6,675,097 B2 | 1/2004 | Routh et al. | |
| 7,069,780 B2 * | 7/2006 | Ander | 73/382 R |
| 7,155,101 B2 | 12/2006 | Shah et al. | |
| 2003/0056381 A1 * | 3/2003 | Brosnahan et al. | 33/313 |
| 2004/0250614 A1 * | 12/2004 | Ander | 73/152.05 |

OTHER PUBLICATIONS

Barber et al, "Determining formation resistivity anisotropy in the presence of invasion", SPE 90526, SPE Annual Technical Conference and Exhibition held in Houston, Texas, US Sep. 26-29, 2004, pp. 1-25.

Green, William, "Inversion of gravity profiles by use of a Backus-Gilbert approach" Geophysics, vol. 40, No. 5 (Oct. 1975), pp. 763-772, 6 Figures.

Hare et al, "The 4-D microgravity method for waterflood surveillance: A model study for the Prudhoe Bay reservoir, Alaska", Geophysics, vol. 64, No. 1 (Jan.-Feb. 1999), pp. 78-87, 11 Figs, 4 Tables.

Last et al, "Compact gravity inversion", Geophysics vol. 48, No. 6, (Jun. 1983), pp. 713-721, 7 figures.

Li et al, "3-D inversion of magnetic data", Geophysics, vol. 61, No. 2, (Mar.-Apr. 1996), pp. 394-408, 18 Figures.

* cited by examiner

*Primary Examiner* — G. Bradley Bennett

(57) ABSTRACT

A method of determining the dip or apparent dip of a section of a subterranean formation is described using the measurements of a borehole gravity meter and a dip-dependent model for the response of the gravity meter.

7 Claims, 3 Drawing Sheets

METHOD OF DETERMINING THE DIP OF A FORMATION

FIELD OF THE INVENTION

This invention relates to methods of determining a formation dip within a subterranean reservoir.

BACKGROUND

It is known to use gravity borehole tools to measure characteristics of geologic formation, particularly in the exploitation of hydrocarbon reservoirs found in geologic formations or in the subsurface storage of carbon dioxide or water. Exploitation of hydrocarbon reservoirs involves characterizing oil, gas, and/or water content of subterranean formations.

The process of measuring physical properties of earth formations beneath the surface of the earth is commonly referred to as "well logging". It comprises the step of lowering sensors or testing equipment mounted on robust tool bodies into a wellbore drilled through the earth. When the tool is suspended from an armored cable the process is more specifically referred to as "wireline" well logging. Alternative conveyance techniques as known in the art include lowering the instruments mounted on drill pipe, casing or production tubing or on coiled tubing. The drill pipe conveyance technique, in particular, is known as "logging while drilling" when measurements are performed during the actual drilling of a wellbore.

Specifically, borehole gravity measurements are a direct measure of the bulk density of the formation surrounding a wellbore. Typically gravity data are taken at different vertical depths or stations along the wellbore. The basic principle of borehole gravity measurements is that the change in gravity relates directly to the bulk density contrast of the formation, the distance from the stations and the density contrast body. The bulk density in turn is directly related to grain densities and the pore fluid (gas, oil or water) densities and porosity of the formation.

Several gravity measurement tools are commercially available or have been proposed in the prior art. A commercially available borehole gravity meter (BHGM) is for example manufactured by LaCoste & Romberg of Lafayette, Colo., USA under the trade name "Micro-g system". Other gravity and gravity difference measuring instruments are described in U.S. Pat. Nos. 5,351,122 and 5,892,151 both issued to Niebauer et al. and 5,903,349 to Vohra et al.

The known gravity tools according to the '151 patent include at least one, preferably several longitudinally spaced apart gravity sensors enclosed in an instrument housing. The gravity sensors are fiber optic interferometry devices, which measure a velocity of a free falling mass by determining, with respect to time, interference fringe frequency of a light beam split between a first path having a length corresponding to the position of the free falling mass, and a second "reference" (fixed length) path. The fringe frequency is related to the velocity of the free falling mass, which can be correlated to earth's gravity by precise measurement of the mass's position and the time from the start of free fall. The measurement of gravity differences is performed by determining a difference in gravity measurements made between two of the individual gravity sensors positioned at locations vertically spaced apart.

Further instruments for gravity and gravity difference measurements are described in the co-owned U.S. Pat. No. 6,671,057 issued to Orban. The proposed instrument includes a gravity sensor with a first mass adapted to fall freely when selectively released from an initial position. The mass has optical elements adapted to change the length of an optical path in response to movements of the mass. The sensor output is coupled to a beam splitter. One output of the splitter is coupled optically directly to an interferometer. Another output of the splitter is coupled to the interferometer through an optical delay line. The frequency of an interference pattern generated is directly related to gravity at the mass. A second such mass having similar optics, optically coupled in series to the first mass and adapted to change the path length in opposed direction when selectively dropped to cause time coincident movement of the two masses, generates an interference pattern having frequency related to gravity difference.

Further known gravity measuring instrument are shown for example in U.S. Pat. No. 7,155,101 to Shah et al.

Methods of applying gravity measuring instruments in the oil industry can be found for example in the above '057 patent and in the U.S. Pat. No. 7,069,780 to Ander, and by J. L. Hare et al. in: The 4-D microgravity method for waterflood surveillance: A model study for the Prudhoe Bay reservoir, Alaska, Geophysics, Vol. 64, No. 1 (January-February 1999), p. 78-87. In the latter study, the gravity observations are inverted to determine the subterranean density distribution. The inversion used in this prior art is posed as a linear, underdetermined inverse problem with an infinite number of possible solutions. The densities range is subjected to a set of constraints resulting in a constrained, linear system which can be solved using least-square methods.

Further forward modeling and inversion techniques are described in the U.S. Pat. No. 6,502,037 to Jorgensen et al and in the U.S. Pat. No. 6,675,097 to Routh et al as well as various other publications including W. R. Green, Inversion of gravity profiles by use of a Backus-Gilbert approach, Geophysics, 40 (1975), 763-772; B. J. Last and Kubik. K., Compact gravity inversion, Geophysics, 48 (1983), 713-721; and Y. Li and Oldenburg, D W., 3D inversion of gravity data, Geophysics, 61 (1996), 2, 394-408.

In geology and reservoir modeling a dip is understood as the angle between a planar feature, such as a sedimentary bed or layer or a fault, and a horizontal plane. A number of different logging tools have been developed and successfully used for many years to determine the dip of the formation beds. The present generation of the resistivity scanner logging tool has for example demonstrated a good ability to estimate the dip angle. These triaxial array induction tools as commercially offered by Schlumberger have the capability to measure at multiple depths of investigation from the wellbore depending on the spacing between transmitters and receivers as described for example by T. Barber et al., Determining Formation Resistivity Anisotropy In The Presence Of Invasion, SPE 90526 (2005). The data are then processed using a 1D inversion algorithm to determine the dip angle of the formations layers. Other logging tools based on micro-resistivity or sonic measurements have also been used to determine the dip of the formation around a wellbore.

In view of the known art, it is seen as an object of the invention to provide a novel method of determining the formation dip and related parameters.

SUMMARY OF INVENTION

According to an aspect of the invention, there is provided a method of determining a dip related parameter of a section of a subterranean formation using the measurements of a borehole gravity meter and a dip-dependent model for the response of the gravity meter.

A preferred embodiment of the method includes the steps of using two constant values representing the density of the dipping section or layer and the density of the formation above and below the dipping section, respectively. In a particularly preferred embodiment of the invention these values are set to 1 for the dipping layer and 0 for the surrounding formation (and hence for the density of the shoulder at infinity).

In another preferred embodiment a parameter relating to the height or thickness of the dipping section is determined using known logging techniques.

In a variant of the invention the dip related parameter as derived from the response of a borehole gravity tool is combined with other independent measurements of dip related parameters.

Further details, examples and aspects of the invention will be described below referring to the following drawings.

DETAILED DESCRIPTION

For the purpose of determining a value for the formation dip from gravity measurements, the present invention proposes first a forward model, which includes an explicit expression of the dip angle or a related parameter. The published and currently applied gravity forward model is mainly expressed by the Newton's law as described in the above-cited Green, 1975 and U.S. Pat. No. 6,502,037. In these models, the gravity field is computed from the contribution of a given mass domain or cell m to the force on the instrument:

$$g_z = G \times \frac{m}{r^2}. \quad [1]$$

where G is the gravitational constant and r the distance from the center of the mass domain to the point of measurement.

By expressing the mass domain by its density ρ, equation [1] above is then re-written as:

$$g_z = G \int_\Omega \frac{\rho}{r^2} d\Omega \quad [2]$$

where Ω is the volume of the density domain.

Figure 1:
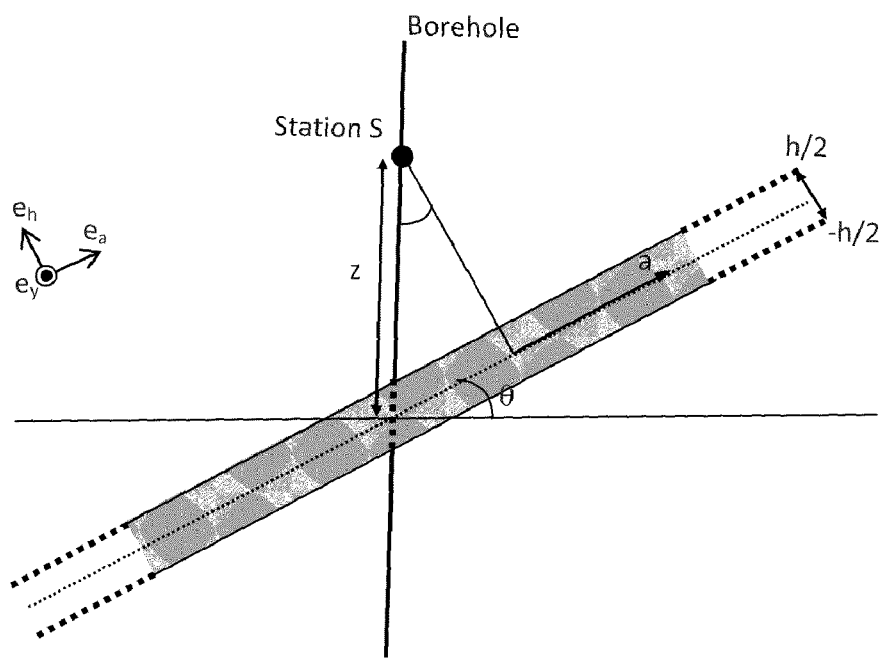
FIG. 1 is schematic representation of a dipping layer used to illustrate parameters of a new forward model for gravity measurements.

In an example of the present invention, an analytic relationship is established to express a new three-dimensional forward model which includes a parameter relating to the dipping angle or the apparent dipping angle (as measured in the borehole). The gravity response $g_z$, from a density formation bed intercepting the borehole at an angle θ, the apparent dip angle, is expressed as $$g_z = G \times \rho \times h \times \int_{-\infty}^{+\infty} \int_{-\infty}^{+\infty} \frac{z \cdot \cos^2(\theta) + a \cdot \sin(\theta)}{(a^2 + z^2 \cdot \cos^2\theta + y^2)^{3/2}} \, da \, dy. \quad [3]$$

where G is the gravitational constant, ρ is the density of the formation bed, h represents the thickness of the layer, and z is the vertical distance between the observation station S at the borehole, and the intersection point between the bed formation and the wellbore. The definitions of layer thickness h and radial distance a from the vertical projection of the station location S onto the center line of the layer are further illustrated in FIG. 1.

It is worth noting that the specific representation [3] of the response of the gravity borehole tool can be replaced by a number of mathematically equivalent relations.

Figure 2A:
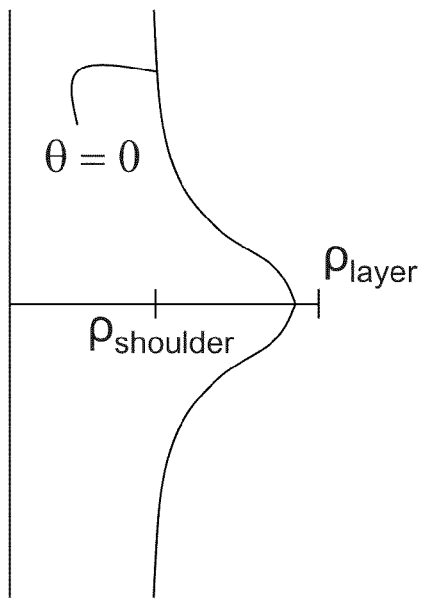
FIG. 2 shows a schematic response of a borehole gravity tool in an original form and a transformed form.
Figure 2B:
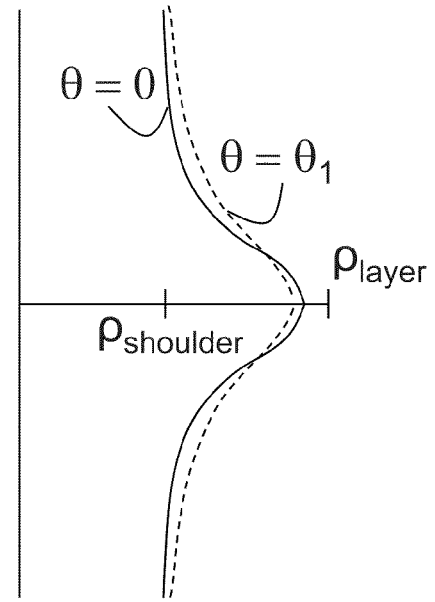
Figure 2C:
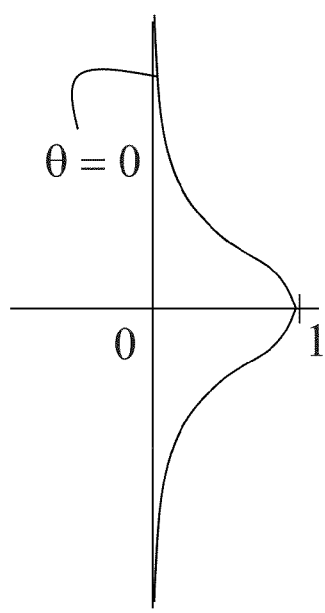
Figure 2D:
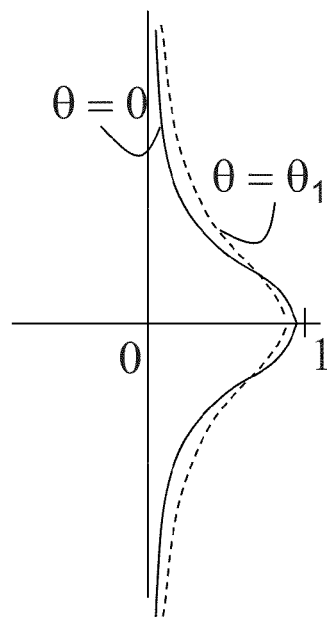

The effect of a dipping formation on the response of a borehole gravity tool is illustrated in FIGS. 2A-2D. In the simplified example of FIG. 2 the assumption is made that the formations above and below the dipping layer have a uniform density $\rho_{shoulder}$. It is further assumed that the layer density $\rho_{layer}$ is larger than the density $\rho_{shoulder}$. Under these assumptions the response of a gravity tool will appear as a curve similar to the curve shown in FIG. 2A for a horizontal (θ=0) layer. In case of a dip of the layer (θ=θ$_1$), the measured data is expected to follow a flatter curve as shown in FIG. 2B.

While it is possible to derive the dip from a direct inversion of curves such as shown in FIG. 2A or 2B, it is seen as advantageous to transform the density to a dimensionfree value. A possible transformation is $\rho_{layer} \rightarrow (\rho_{layer} - \rho_{shoulder})/\rho_{shoulder}$ and $\rho_{shoulder} \rightarrow 0$. This transformation or rescaling transforms the curves of FIGS. 2A and 2B into the curves of FIGS. 2C and 2D, respectively. The transformed curves are independent of the absolute values of density and can hence be applied generally. For any given height of the dipping layer, a table can be pre-calculated which lists the expected response of the gravity tool at a specific location or distance from the layer for any dipping angle. An example of such a table of $g_z$ responses is shown below as Table 1.

TABLE 1

|  | θ = 0 | θ = π/6 | θ = π/3 | θ = π/2 |
| --- | --- | --- | --- | --- |
| z = 1 m | 1 | 0.877 | 0.5236 | 0 |
| z = 2 m | 0.903 | 0.803 | 0.5 | 0 |
| z = 5 m | 0.648 | 0.605 | 0.428 | 0 |

Table 1 is given for illustration only in order to demonstrate the dependence of the gravity response from the dipping angle θ. The response has been calculated assuming a transformed density of 1 for the dipping layer and a transformed density of 0 for the formation below and above the dipping layer. A layer thickness h of 2 m is assumed for this example while the formation below and above is further assumed to extend to infinity. The response is normalized taking the maximum value of the tool response to be 1. The depth stations or values of z have been selected to indicate locations above the dipping layer exploiting the symmetry between measurements above and below the dipping layer as apparent from FIG. 1.

Tables such as Table 1 can be calculated for any number of dipping angles between 0 and 90 degrees and for any desired height or thickness of the dipping layer. Hence once a conventional logging operation provides a measure of the thickness of a layer, the normalized response of the gravity tool can be compared with the corresponding table to determine a matching dipping angle.

The dipping angle as determined by borehole gravity measurements can be further combined with other dip measurements such as provided by the resistivity and imaging logging tools as described above when referring to the background of the invention. Combining several independent measurements of dip enhances the estimation of the dip angle particularly as some of the measurements have varying depths of investigation. These depths of investigation range from a few centimeters as in the case of micro-resistivity based loggings tools to few meters for sonic tool and up to hundred meters or more for the gravity tool. The combination of these measurements can therefore be regarded as ideally suited to extend the known dip measurement techniques which are accurate only within a narrow radius from the wellbore to reservoir scale, i.e. into the space between wells.

While the measurements can be combined in various ways, the following presents a particular expression which includes three data logs. Each type of measurement is multiplied by a weighting coefficient to give weight to good quality logging datasets that might be more useful for the dip estimation over datasets of lower quality and hence desensitize measurements with poor quality information. The resulting dip angle θ should comply with the three logging data information and the best estimate of the dip derived should represent a good balance between the different dip angles estimations. Hence, the dip angle is determined in the particular example by the following average:

$$\theta = \beta \times f^{-1}(BGT \text{ data}) + \gamma \times g^{-1}(Rt \text{ scanner data}) + (1 - \beta - \gamma) \times h^{-1}(FMI \text{ data}). \quad [3]$$

where f, g and h represent the forward models used to derive the dip angle from gravity, the resistivity and the FMI measurements, respectively. The β and γ are the weighting coefficients corresponding respectively to the borehole gravity and the resistivity tools for dip estimates.

Figure 3:
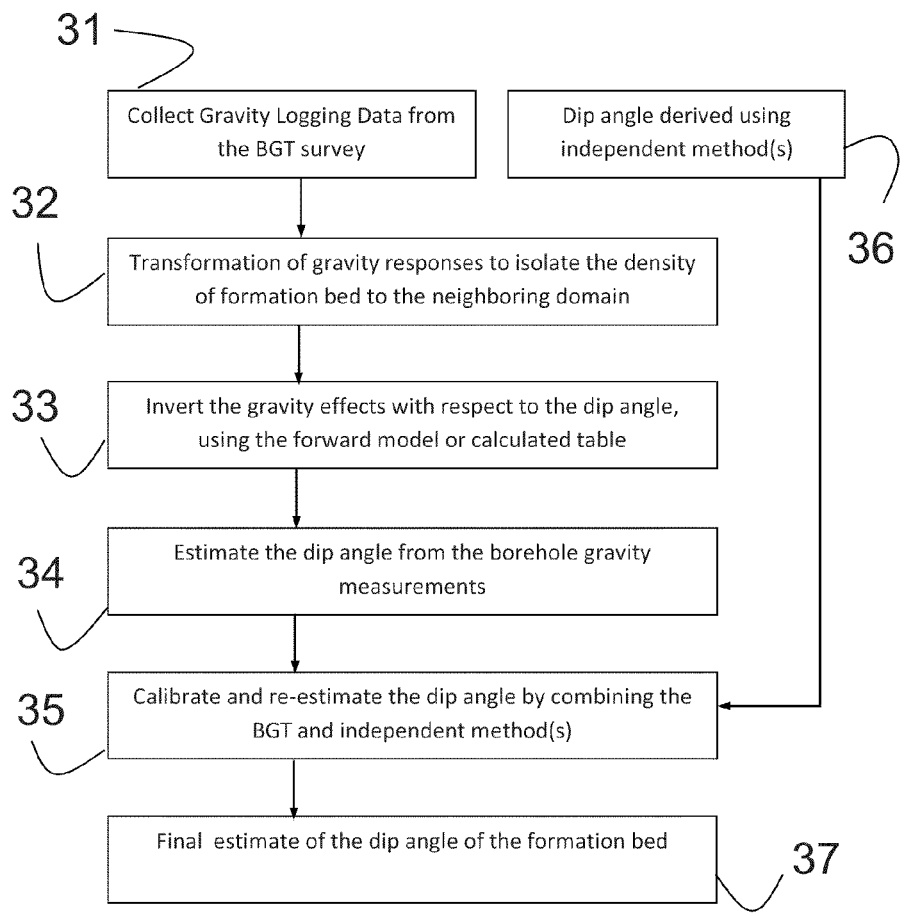
FIG. 3 is a flow chart illustrating steps of a method in accordance with an example of the invention.

The above steps are summarized in the flow chart of FIG. 3 describing the initial step 31 of obtaining measurement of a borehole gravity tool (BHGT). The data are then transformed in Step 32 to constant values of density and a normalized tool response. The transformed response results in the determination a dipping angle using forward model and tables (Steps 33, 34) as described above (eq. [3] and Table 1). When combined (Step 35) with other independently established measures as gained through a different measurement (Step 36), a final value 37 of the dipping angle can be gained with increased accuracy or higher confidence.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative processes, one skilled in the art will recognize that the system may be embodied using a variety of specific procedures and equipment and could be performed to evaluate widely different types of formations. Accordingly, the invention should not be viewed as limited except by the scope of the appended claims.

What is claimed is:

1. A method of determining the dip of a section of a subterranean formation, comprising the step of obtaining measurements of a gravity meter at the vicinity of the location where a borehole intersects said dipping section and using a model of a dip-dependent response of said gravity meter to convert said measurement into a parameter representing said dip.

2. The method of claim 1, wherein the model of the dip-dependent response includes a function which represents the vertical component $g_z$ of said response as a function of a dip angle θ.

3. The method of claim 1, using log measurements of bedding or layer thickness to derive a thickness of the dipping section.

4. The method of claim 1, wherein for the purpose of determining the parameter representing the dip the density is re-scaled.

5. The method of claim 4, wherein for the purpose of determining the parameter representing the dip the density is re-scaled to a first constant value representing formation density exterior of the dipping section and a second constant value representing formation density interior of the dipping section.

6. The method of claim 1, further combining the parameter representing said dip as gained from the gravity measurements with dip determinations gained from other measurements.

7. The method of claim 6, wherein the other measurements are selected from a group consisting of acoustic, sonic, resistivity, inductive dielectric or optical measurements.

* * * * *